United States Patent
Ishizuka et al.

(10) Patent No.: US 8,925,737 B2
(45) Date of Patent: *Jan. 6, 2015

(54) CRYSTALLINE POLYMER MICROPOROUS MEMBRANE AND FILTRATION FILTER

(75) Inventors: Kenichi Ishizuka, Kanagawa (JP); Nobuhiro Nishita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 960 days.

This patent is subject to a terminal disclaimer.

(21) Appl. No.: 13/053,936

(22) Filed: Mar. 22, 2011

(65) Prior Publication Data

US 2011/0240553 A1  Oct. 6, 2011

(30) Foreign Application Priority Data

Mar. 31, 2010 (JP) ................................. 2010-083916

(51) Int. Cl.
| | | |
|---|---|---|
| *B01D 39/00* | (2006.01) | |
| *B01D 63/00* | (2006.01) | |
| *B01D 69/12* | (2006.01) | |
| *B01D 67/00* | (2006.01) | |
| *B01D 71/36* | (2006.01) | |
| *B32B 27/08* | (2006.01) | |

(52) U.S. Cl.
CPC ............. *B01D 69/12* (2013.01); *B01D 67/002* (2013.01); *B01D 71/36* (2013.01); *B32B 27/08* (2013.01); *B01D 2325/02* (2013.01); *B01D 2325/22* (2013.01); *B01D 2325/30* (2013.01)
USPC ............ 210/500.36; 210/500.27; 210/321.75; 210/490; 264/288.4

(58) Field of Classification Search
CPC .. B01D 71/36; B01D 69/02; B01D 2325/022; B01D 69/10
USPC ................... 210/500.36, 500.27, 321.6, 490, 210/321.75; 264/127, 175, 288.4, 288.9, 264/20.2, 292; 428/132
See application file for complete search history.

(56) References Cited

U.S. PATENT DOCUMENTS

| | | |
|---|---|---|
| 1,421,341 A | 6/1922 | Zsigmondy |
| 2,783,894 A | 3/1957 | Lovell et al. |

(Continued)

FOREIGN PATENT DOCUMENTS

| | | |
|---|---|---|
| DE | 3003400 | 8/1980 |
| DE | 3138525 C2 | 4/1983 |

(Continued)

OTHER PUBLICATIONS

Japanese Office Action "Notification of Reasons for Refusal" dated Feb. 26, 2013, which corresponds to Japanese Patent Application No. 2010-083916 and is related to U.S. Appl. No. 13/053,936 with partial translation.

*Primary Examiner* — Ana Fortuna
(74) *Attorney, Agent, or Firm* — Studebaker & Brackett PC

(57) ABSTRACT

A crystalline polymer microporous membrane, which contains: a laminate of two or more layers including a layer containing a first crystalline polymer and a layer containing a second crystalline polymer, the laminate having a plurality of pores each piercing through the laminate in a thickness direction thereof, wherein the first crystalline polymer has higher crystallinity than crystallinity of the second crystalline polymer, and the layer containing the first crystalline polymer has the maximum thickness thicker than the maximum thickness of the layer containing the second crystalline polymer, and wherein at least one layer in the laminate has a plurality of pores whose average diameter continuously or discontinuously changes along with a thickness direction of the laminate at least at part thereof.

12 Claims, 7 Drawing Sheets

(56) References Cited

U.S. PATENT DOCUMENTS

| | | | |
|---|---|---|---|
| 2,944,017 A | 7/1960 | Cotton | |
| 3,133,132 A | 5/1964 | Loeb et al. | |
| 3,408,315 A | 10/1968 | Paine | |
| 4,196,070 A | 4/1980 | Chao et al. | |
| 4,340,479 A | 7/1982 | Pall | |
| 4,340,480 A | 7/1982 | Pall et al. | |
| 4,340,482 A | 7/1982 | Sternberg | |
| 4,450,126 A | 5/1984 | Kesting | |
| 4,454,085 A | 6/1984 | Schindler et al. | |
| 5,814,405 A * | 9/1998 | Branca et al. | 428/311.51 |
| 8,002,874 B2 * | 8/2011 | Huang et al. | 95/50 |
| 8,011,518 B2 * | 9/2011 | Hokazono et al. | 210/500.36 |
| 8,151,998 B2 * | 4/2012 | Hokazono | 210/500.36 |
| 8,153,041 B2 * | 4/2012 | Okada et al. | 264/127 |
| 8,309,181 B2 * | 11/2012 | Ishizuka et al. | 427/385.5 |
| 8,573,408 B2 * | 11/2013 | Ishizuka et al. | 210/506 |
| 2009/0061205 A1 * | 3/2009 | Hokazono et al. | 428/316.6 |
| 2009/0127187 A1 * | 5/2009 | Hokazono et al. | 210/493.1 |
| 2011/0000846 A1 * | 1/2011 | Ishizuka et al. | 210/493.5 |
| 2011/0049044 A1 * | 3/2011 | Okada et al. | 210/500.27 |
| 2011/0073541 A1 * | 3/2011 | Ishizuka et al. | 210/500.37 |
| 2011/0120937 A1 * | 5/2011 | Ishizuka et al. | 210/493.1 |
| 2011/0120938 A1 * | 5/2011 | Ishizuka et al. | 210/493.5 |
| 2011/0120939 A1 * | 5/2011 | Ishizuka et al. | 210/500.27 |
| 2011/0127212 A1 * | 6/2011 | Ishizuka et al. | 210/493.5 |
| 2011/0240551 A1 * | 10/2011 | Ishizuka et al. | 210/490 |
| 2011/0240552 A1 * | 10/2011 | Ishizuka et al. | 210/490 |
| 2011/0240553 A1 * | 10/2011 | Ishizuka et al. | 210/490 |

FOREIGN PATENT DOCUMENTS

| | | |
|---|---|---|
| GB | 2041821 A | 9/1980 |
| JP | 48-040050 | 11/1973 |
| JP | 55-099934 | 7/1980 |
| JP | 58-037842 | 3/1983 |
| JP | 58-091732 | 5/1983 |
| JP | 03-179038 | 8/1991 |
| JP | H03-179039 A | 8/1991 |
| JP | 11-035716 | 2/1999 |
| JP | 2009-501632 A | 1/2009 |
| JP | 2009-061363 | 3/2009 |

* cited by examiner

CRYSTALLINE POLYMER MICROPOROUS MEMBRANE AND FILTRATION FILTER

BACKGROUND OF THE INVENTION

1. Field of the Invention

The present invention relates to a crystalline polymer microporous membrane, and a filtration filter using such crystalline polymer microporous membrane.

2. Description of the Related Art

Microporous membranes have been known for long and widely used for filtration filters, etc. As such microporous membranes, there are, for example, a microporous membrane using cellulose ester as a material thereof (see U.S. Pat. Nos. 1,421,341, 3,133,132, and 2,944,017, Japanese Patent Application Publication (JP-B) No. 48-40050), a microporous membrane using aliphatic polyamide as a material thereof (see U.S. Pat. Nos. 2,783,894, 3,408,315, 4,340,479, 4,340,480, and 4,450,126, German Patent No. 3,138,525, and Japanese Patent Application Laid-Open (JP-A) No. 58-37842), a microporous membrane using polyfluorocarbon as a material thereof (see U.S. Pat. Nos. 4,196,070, and 4,340,482, and JP-A Nos. 55-99934 and 58-91732), a microporous membrane using polypropylene as a material thereof (see West German Patent No. 3,003,400), and the like.

These microporous membranes are used for filtration and sterilization of washing water for use in the electronics industries, water for medical use, water for pharmaceutical production processes and water for use in the food industry. In recent years, the applications of and amount for using microporous membranes have increased, and microporous membranes have attracted great attention because of their high reliability in trapping particles. Among them, microporous membranes made of crystalline polymers are superior in chemical resistance, and in particular, microporous membranes produced by using polytetrafluoroethylene (PTEF) as a raw material are superior in both heat resistance and chemical resistance. Therefore, demands for such microporous membranes have been rapidly growing.

These microporous membranes are used for filtration and sterilization of washing water for use in the electronics industries, water for medical use, water for pharmaceutical production processes and water for use in the food industry. In recent years, the applications of and amount for using microporous membranes have increased, and microporous membranes have attracted great attention because of their high reliability in trapping particles. Among them, microporous membranes made of crystalline polymers are superior in chemical resistance, and in particular, microporous membranes produced by using polytetrafluoroethylene (may also referred to as "PTEF" hereinafter) as a raw material are superior in both heat resistance and chemical resistance. Therefore, demands for such microporous membranes have been rapidly growing.

As for such crystalline polymer microporous membrane, there is a proposal of a porous membrane produced by rolling a multi-layer paste formed of polymers each having a different fusion thermal peak of crystals (see JP-A No. 03-179038). Since pores whose diameters are continuously changes along with the thickness direction are not formed in this porous membrane, the membrane cannot efficiently capture fine particles, and has short service life as a filter.

In order to efficiently capture fine particles, moreover, there is a proposal of a membrane, which is formed by laminating layers each formed of a polymer of a different molecular weight, and in each layer of which pores are formed to have a diameter that continuously changes with respect to the thickness direction of the layer (see JP-A No. 2009-61363).

However, in this crystalline polymer microporous membrane, a thickness of a dense layer formed of a low molecular weight crystalline polymer, it is difficult to satisfy all of the required properties for the membrane, such as high flow rate, no clogging, long service life, and high strength, at the desirable balance.

Accordingly, there is currently strong demands for a crystalline polymer microporous membrane and a filtration filter using such membrane, which are capable of efficiently capturing fine particles, have high filtration rate, do not cause clogging, has long service life, and have high durability.

BRIEF SUMMARY OF THE INVENTION

The present invention aims at providing a crystalline polymer microporous membrane which is capable of efficiently capturing fine particles, has high filtration rate, does not cause clogging, has long service life, and has high durability, as well as a filtration filter using such crystalline polymer microporous membrane.

Means for solving the aforementioned problems are as follows:

<1> A crystalline polymer microporous membrane, containing:

a laminate of two or more layers including a layer containing a first crystalline polymer and a layer containing a second crystalline polymer, the laminate having a plurality of pores each piercing through the laminate in a thickness direction thereof, wherein the first crystalline polymer has higher crystallinity than crystallinity of the second crystalline polymer, and the layer containing the first crystalline polymer has the maximum thickness thicker than the maximum thickness of the layer containing the second crystalline polymer, and wherein at least one layer in the laminate has a plurality of pores whose average diameter continuously or discontinuously changes along with a thickness direction of the laminate at least at part thereof.

<2> The crystalline polymer microporous membrane according to <1>, wherein the laminate contains two or more layers of the layer containing the first crystalline polymer, and one layer of the layer containing the second crystalline polymer.

<3> The crystalline polymer microporous membrane according to <2>, wherein the laminate contains two layers of the layer containing the first crystalline polymer, and one layer of the layer containing the second crystalline polymer provided between the two layers of the layer containing the first crystalline polymer.

<4> The crystalline polymer microporous membrane according to <3>, wherein the two layers of the layer containing the first crystalline polymer each has a thickness larger than that of the layer containing the second crystalline polymer.

<5> The crystalline polymer microporous membrane according to any one of <1> to <4>, wherein the crystalline polymer microporous membrane has a thickness of 1 μm to 300 μm.

<6> The crystalline polymer microporous membrane according to any one of <1> to <5>, wherein the crystallinity of the first crystalline polymer is 1.02 or more times the crystallinity of the second crystalline polymer.

<7> The crystalline polymer microporous membrane according to any one of <1> to <6>, wherein the first crystalline polymer is polytetrafluoroethylene.

<8> The crystalline polymer microporous membrane according to any one of <1> to <7>, wherein the second crystalline polymer is polytetrafluoroethylene, or a polytetrafluoroethylene copolymer.

<9> The crystalline polymer microporous membrane according to <8>, wherein the polytetrafluoroethylene copolymer is a copolymer containing at least two polymer components selected from the group consisting of tetrafluoroethylene, perfluoroalkylvinyl ether, hexafluoropropylene, and chlorotrifluoroethylene.

<10> The crystalline polymer microporous membrane according to any one of <1> to <9>, wherein the pores on one surface of the crystalline polymer microporous membrane have an average pore diameter of 0.05 µm to 1.0 µm, and the pores on the other surface of the crystalline polymer microporous membrane have an average pore diameter of 0.5 µm to 100 µm.

<11> A filtration filter, containing:
the crystalline polymer microporous membrane as defined in any one of <1> to <10>.

<12> The filtration filter according to <11>, wherein a surface of the crystalline polymer microporous membrane having an average pore diameter larger than the other surface thereof is arranged as a filtering surface of the filtration filter.

The present invention solves the various problems in the art, and achieves the aforementioned object. The present invention provides a crystalline polymer microporous membrane which is capable of efficiently capturing fine particles, has high filtration rate, does not cause clogging, has long service life, and has high durability, as well as a filtration filter using such crystalline polymer microporous membrane.

DETAILED DESCRIPTION OF THE INVENTION

Crystalline Polymer Microporous Membrane

Figure 1:
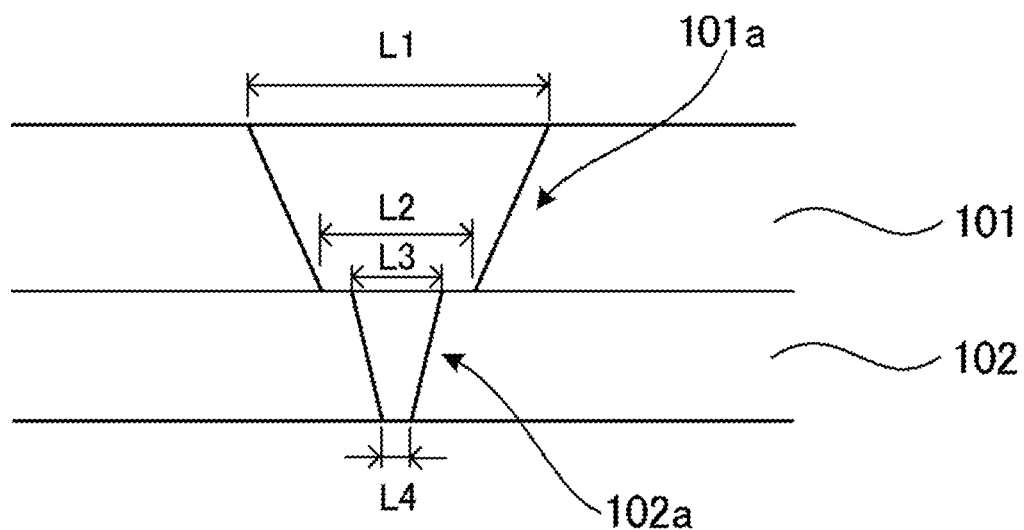
FIG. 1 is a schematic diagram showing one example of the crystalline polymer microporous membrane of the two-layer structure of the present invention.

The crystalline polymer microporous membrane of the present invention contains at least a laminate, and may further contain other structures, if necessary.

<Laminate>

The laminate contains at least a layer containing a first crystalline polymer (may also referred to as "high crystalline polymer" hereinafter) and a layer containing a second crystalline polymer (may also referred to as "low crystalline polymer" hereinafter), and may further contain other layers, if necessary.

The laminate means "a multilayer structure" formed by stacking two or more crystalline polymer layers, not "a single-layer structure."

The aforementioned "laminate structure" can be clearly distinguished from the "single-layer structure", which has no border in the structure, by the fact that the laminate structure has a border between a crystalline polymer layer and another crystalline polymer layer. Here, the presence of the border between a crystalline polymer layer and another crystalline polymer can be detected for example by observing a cross-section of the crystalline polymer microporous membrane cut in the direction along with a thickness through an optical microscope or a scanning electron microscope (SEM).

The structure of the laminate is suitably selected depending on the intended purpose without any restriction, provided that the structure contains two or more layers. The structure of the laminate is preferably a structure thereof containing two or more layers each containing the first crystalline polymer (i.e., high crystalline polymer) and one layer containing the second crystalline polymer (i.e., low crystalline polymer), more preferably a three-layer structure containing two layers each containing the first crystalline polymer (i.e., high crystalline polymer), and one layer containing the second crystalline polymer (i.e., low crystalline polymer) provided between the two layers each containing the first crystalline polymer (i.e., high crystalline polymer).

By giving the three-layer structure to the crystalline polymer microporous membrane, as well as preventing the membrane from curling caused by the difference in the shrinkage rate between layers, the capturing performance of the membrane can be stabilized by preventing the second crystalline polymer (i.e. the low crystalline polymer layer) having the smallest pore diameter, which gives the largest influence to a diameter of particles to be captured, from factors of physical damages such as frictions and scratches.

Moreover, in the three-layer structure, it is preferred that a thickness of one of the layers each containing the first crystalline polymer (i.e., high crystalline polymer) be thicker than a thickness of the layer containing the second crystalline polymer (i.e., low crystalline polymer), and the other layer containing the first crystalline polymer (i.e., high crystalline polymer) is thicker than the thickness of the layer containing the second crystalline polymer (i.e., low crystalline polymer). By arranging the crystalline polymer microporous membrane so that the layer having the first crystalline polymer (i.e., high crystalline polymer) thicker than that of the layer containing the second crystalline polymer (i.e., low crystalline polymer) faces the side of an outlet, a flow rate of the crystalline polymer microporous membrane can be improved.

Figure 14:
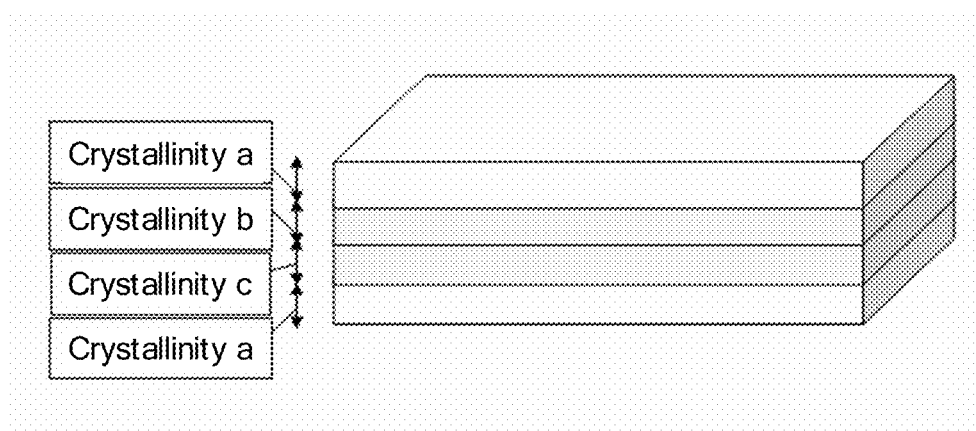
FIG. 14 is a schematic diagram showing one example of the crystalline polymer microporous membrane of the four-layer structure of the present invention.
Figure 15:
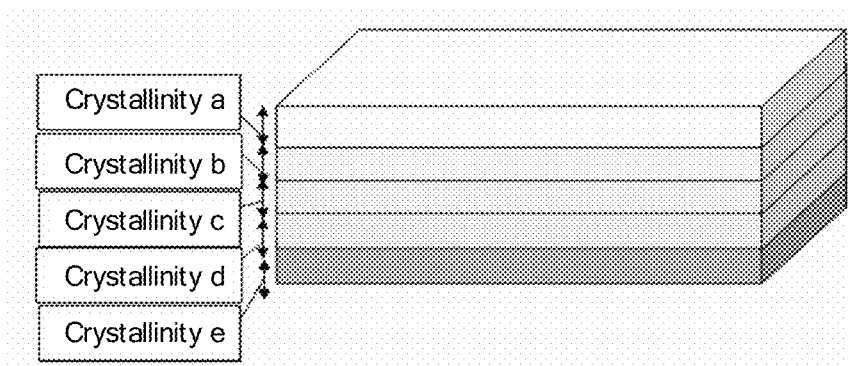
FIG. 15 is a schematic diagram showing one example of the crystalline polymer microporous membrane of the five-layer structure of the present invention.

Examples of the structure of the laminate include: a four-layer laminate structure (FIG. 14) in which the crystalline polymer layers having three different crystallinities (molecular weights), i.e. crystallinity a, b, and c, are included; and a five-layer laminate structure (FIG. 15) in which the crystalline polymer layers having five different crystallinities (molecular weights), i.e. crystallinity a, b, c, d, and e, are included. Here, it is preferred that the crystalline polymer layer closer to the side of the outlet (side of the outlet for filtrate) have the lower crystallinity (molecular weight) of the crystalline polymer forming the crystalline polymer.

In the crystalline polymer microporous membrane of the present invention, a plurality of pores piercing through the laminate are formed in the thickness direction of the laminate, and at least one of the layers constituting the laminate has a plurality of pores whose average diameter is continuously or discontinuously changed along with the thickness direction of the laminate at least at part thereof. According to such configuration, the crystalline polymer microporous membrane can efficiently capture fine particles without causing clogging, and give long service life.

The fact "a plurality of pores piercing through the laminate are formed" can be confirmed by observing under an optical microscope or a scanning electron microscope (SEM).

The change of the average pore diameter along with the thickness direction is either continuous or discontinuous increase, or continuous or discontinuous decrease.

Figure 12:
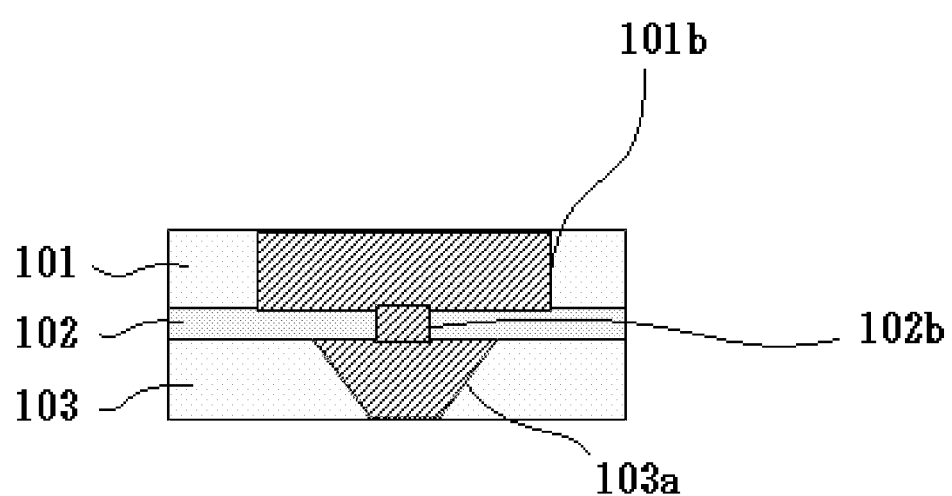
FIG. 12 is a schematic diagram showing one example of the crystalline polymer microporous membrane of the three-layer structure of the present invention (part 2).
Figure 13:
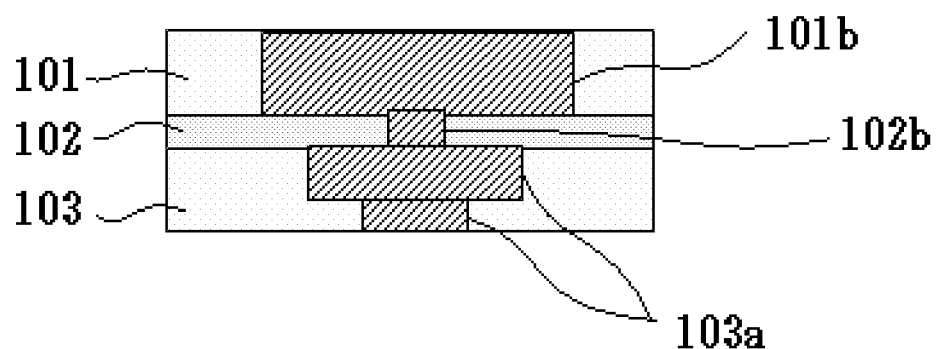
FIG. 13 is a schematic diagram showing one example of the crystalline polymer microporous membrane of the three-layer structure of the present invention (part 3).

The aforementioned phrase "at least one of the layers constituting the laminate has a plurality of pores whose average diameter is continuously or discontinuously changed along with the thickness direction of the laminate at least at part thereof" means that when the distance (d) from the front surface of the crystalline polymer microporous membrane in the thickness direction (which is equivalent to the depth from the front surface) is plotted on the horizontal axis on a graph, and the average pore diameter (D) is plotted on the vertical axis on the graph, (1) the graph covering from the front surface (d=0) to the back surface (d=film thickness) is represented by one continuous line (continuous change) per crystalline polymer layer, and the inclination (dD/dt) of the graph is in the region of negative (decreasing) or positive (increasing), and (2) the graph covering from the front surface (d=0) to the back surface (d=film thickness) is represented by one continuous or discontinuous line per crystalline polymer layer. Namely, it contains embodiments illustrated in FIGS. 12 and 13. Here, the region where the inclination is 0 (zero) (no change) may be included in part or entirely, but it is preferred that the graph include a complete inclination without containing the region where the inclination is 0 (zero) (no change).

Among the aforementioned embodiments, the particularly preferable embodiment is such that the graph representing the average diameter of pores in at least one layer of the laminate being continuously decreased.

In the present specification, the plane of the crystalline polymer microporous membrane on which the average diameter of the pores is larger than the other plane, which is present the opposite side to the side to be subjected to asymmetric heating, is referred to as "a front surface," and the other plane on which the average diameter of the pore is smaller, which is the side to be subjected to asymmetric heating, is referred to as "a back surface". However, these are merely names applied for convenience to explaining the present invention in a simple manner. Therefore, either plane of the unbaked laminated polytetrafluoroethylene film (laminate) can be subjected to asymmetric heating to be "the back surface."

In the crystalline polymer microporous membrane, the ratio of the average diameter of the pores on the front surface to that on the back surface (the average pore diameter of the front surface/the average pore diameter of the back surface) is suitably selected depending on the intended purpose without any restriction, but it is preferably 1.2 times to $2.0 \times 10^4$ times, more preferably 1.5 times to $1.0 \times 10^4$ times, and even more preferably 2.0 times to $2.0 \times 10^3$ times.

The average diameter of the pores on the front surface of the crystalline polymer microporous membrane is suitably selected depending on the intended purpose without any restriction, but it is preferably 0.1 µm to 500 µm, more preferably 0.25 µm to 250 µm, and even more preferably 0.50 µm to 100 µm.

When the average diameter thereof is smaller than 0.1 µm, the flow rate of the resulting membrane may decrease. When the average diameter thereof is larger than 500 µm, the resulting membrane may not efficiently capture fine particles. By contrast, when the average diameter thereof is within the aforementioned even more preferable range, it is advantageous because the resulting membrane achieve both the desirable flow rate and fine particle capturing ability.

The average pore diameter of the pores present on the back surface of the crystalline polymer microporous membrane is suitably selected depending on the intended purpose without any restriction, but it is preferably 0.01 µm to 5.0 µm, more preferably 0.025 µm to 2.5 µm, and even more preferably 0.05 µm to 1.0 µm.

When the average pore diameter is smaller than 0.01 µm, the flow rate of the resulting crystalline polymer microporous membrane may be low. When the average pore diameter is larger than 5.0 µm, the resulting crystalline polymer microporous membrane may not be able to efficiently capture fine particles. When the average pore diameter is within the aforementioned even more preferable range, it is advantageous in light of the flow rate and the fine particle capturing performance.

As shown in FIG. 1, the diameters of the pores 101a, 102a in the crystalline polymer microporous membrane of the present invention having a two-layer structure laminating two crystalline polymer layers 101, 102 all change (continuously decrease) along with the thickness direction of the laminate. Looking at the crystalline polymer microporous membrane as a whole, the pore diameters change (decrease stepwise) in the thickness direction thereof.

Figure 2:
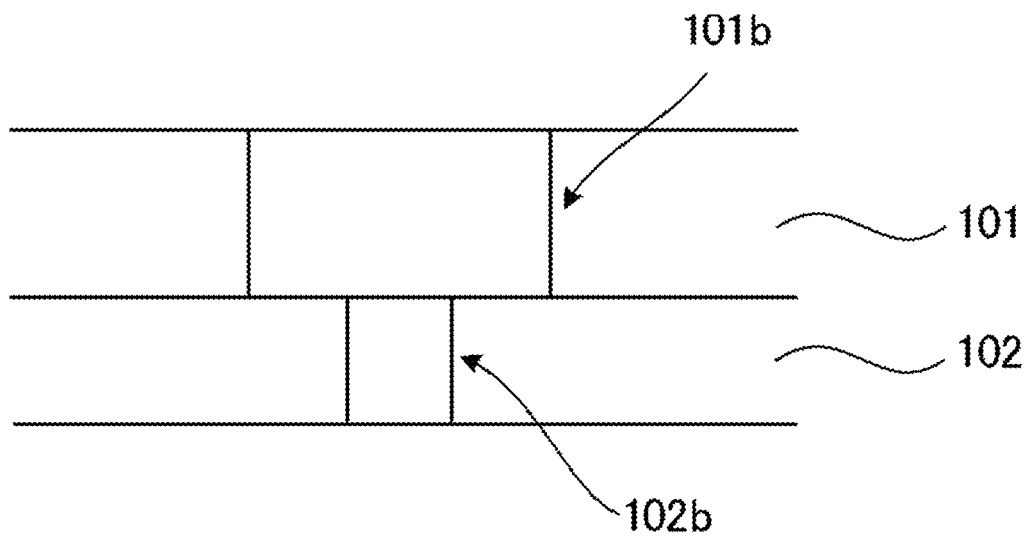
FIG. 2 is a schematic diagram showing one example of the conventional crystalline polymer microporous membrane of the two-layer structure.

Comparing to this, as shown in FIG. 2, all the diameters of the pores 101b, 102b in the conventional crystalline polymer microporous membrane having a two-layer structure laminating two crystalline polymer layers 101, 102 do not change in the thickness direction of the laminate, and the pore diameters change (decrease stepwise) in the thickness direction of the crystalline polymer microporous membrane, as a whole.

Figure 3:
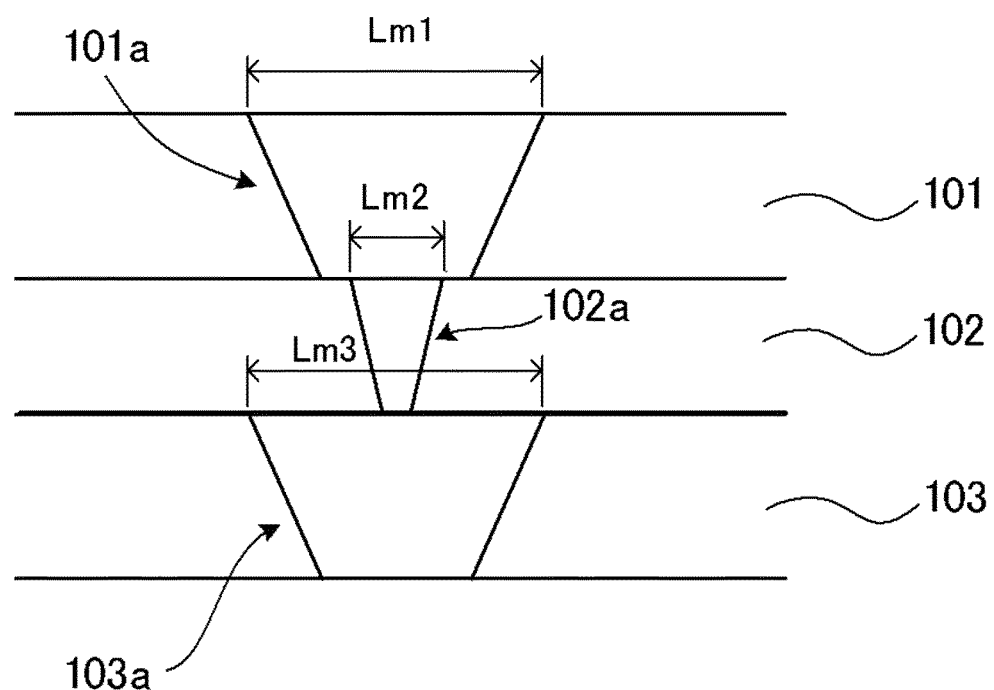
FIG. 3 is a schematic diagram showing one example of the crystalline polymer microporous membrane of the three-layer structure of the present invention (part 1).

Moreover, as shown in FIG. 3, the diameters of the pores 101a, 102a, 103a of the crystalline polymer microporous membrane of the present invention having a three-layer structure in which crystalline polymer layers 101, 102, 103 are laminated all changed (continuously decrease) along with the thickness direction of the laminate. Looking at the crystalline polymer microporous membrane as a whole, the pore diameters change (decrease stepwise) in the thickness direction thereof.

Figure 4:
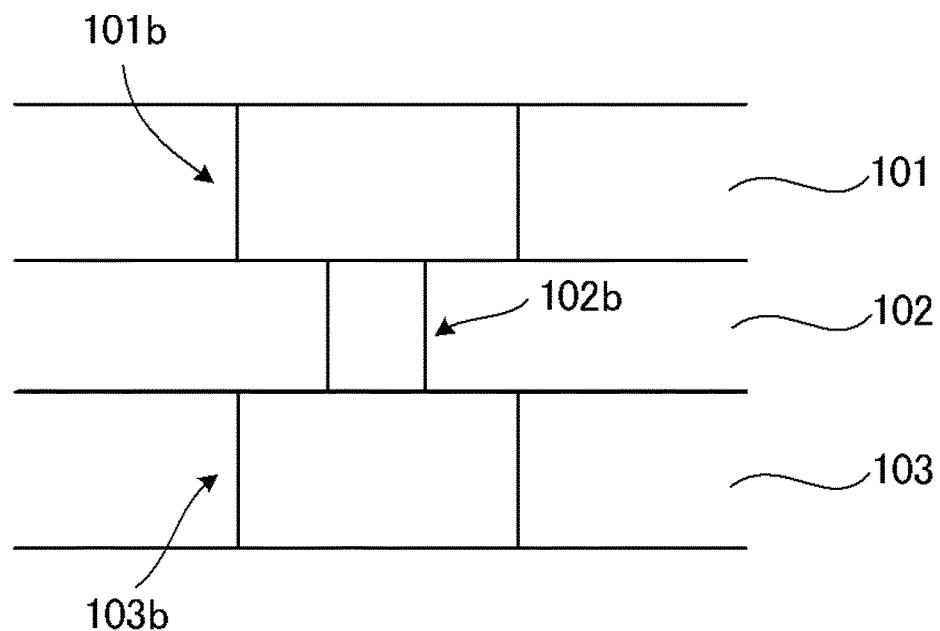
FIG. 4 is a schematic diagram showing one example of the conventional crystalline polymer microporous membrane of the three-layer structure.

To compare with this, as shown in FIG. 4, all of the diameters of pores 101b, 102b, 103b of the crystalline polymer microporous membrane of the conventional three-layer structure in which three crystalline polymer layers 101, 102, 103 are laminated do not change in the thickness direction of the laminate, and as a whole, there are portions where the diameters of the pores change stepwise along with the thickness direction of the laminate.

Moreover, the crystalline polymer layers in the crystalline polymer microporous membrane each preferably have different pore opening diameters at the ends. Specifically, as shown in FIG. 1, in the case where the diameters of the pores 101a, 102a of each crystalline polymer layer 101, 102 continuously or discontinuously reduces along with the thickness direction of the laminate, the opening diameters L1, L2 of the both ends have a relationship of L1>L2, the opening diameters L3, L4 of the both ends have a relationship of L3>L4.

In this case, in each crystalline polymer layer, the ratio of the average pore diameter of the front surface to that of the back surface (the average pore diameter of the front surface/the average pore diameter of the back surface) is suitably selected depending on the intended purpose without any restriction, but it is preferably 1.1 times to 30 times, more preferably 1.25 times to 25 times, and even more preferably 1.5 times to 20 times.

The average diameter of the pores present in the front surface of each crystalline polymer layer is suitably selected depending on the intended purpose without any restriction, but it is preferably 0.001 μm to 500 μm, more preferably 0.002 μm to 250 μm, and even more preferably 0.005 μm to 100 μm.

The average diameter of the pores present in the back surface of each crystalline polymer is suitably selected depending on the intended purpose without any restriction, but it is preferably 0.001 μm to 500 μm, more preferably 0.002 μm to 250 μm, and even more preferably 0.003 μm to 100 μm.

Moreover, it is preferred that the crystalline polymer having the maximum average pore diameter be present at the inner portion of the laminate in which the three or more crystalline polymer layers are laminated. By arranging the laminate in such manner, the crystalline polymer having the minimum average pore diameter, which largely influences to the diameter of particles to be captured, can be protected from physical damages such as abrasion or scratching, and hence the particle capturing performance of the resulting crystalline polymer microporous membrane can be stabilized.

As shown in FIG. 3, in the case where the three-layer structure crystalline polymer microporous membrane in which the crystalline polymer layers 101, 102, 103 are laminated has pores 101a, 102a, 103a whose maximum average pore diameters are respectively Lm1, Lm2, Lm3, the crystalline polymer layer 102 having the smallest maximum average pore diameter Lm2 among the maximum average pore diameter Lm1, Lm2, Lm3 is present at the inner portion of the crystalline polymer microporous membrane (i.e. the laminate).

The average pore diameter is, for example, measured in the following manner. A surface or cross-section of the membrane is photographed (SEM photograph with a magnification of ×1,000 to ×50,000) using a scanning electron microscope (HITACHI S-4300, 4700 type, manufactured by Hitachi, Ltd.), and an image of the obtained photograph is taken into an image processing apparatus (Name of main body: TV IMAGE PROCESSOR TVIP-4100II, manufactured by Nippon Avionics Co., Ltd., Name of control software: TV IMAGE PROCESSOR IMAGE COMMAND 4198, manufactured by Ratoc System Engineering Co., Ltd.) so as to extract an image only containing crystalline polymer fibers. Based on this image of the crystalline polymer fibers, the average pore diameter is calculated by arithmetically processing the measured pores on the image.

The most frequent pore diameter is suitably selected depending on the intended purpose without any restriction, but it is preferably 0.001 μm to 0.5 μm.

When the most frequent pore diameter is smaller than 0.001 μm, the resulting membrane may not have a sufficient flow rate. When the most frequent pore diameter is larger than 0.5 μm, the resulting membrane may have an impaired capturing rate for particles of a small diameter.

The most frequent pore diameter can be measured by Perm Porometer manufactured by Porous Materials, Inc.

—Crystalline Polymer—

In the present specification, the term "crystalline polymer" means a polymer having a molecular structure in which crystalline regions containing regularly-aligned long-chain molecules are mixed with amorphous regions having not regularly aligned long-chain molecules. Such polymer exhibits crystallinity through a physical treatment. For example, if a polyethylene film is drawn by an external force, a phenomenon is observed in which the initially transparent film turns to the clouded film in white. This phenomenon is derived from the expression of crystallinity which is obtained when the molecular alignment in the polymer is aligned in one direction by the external force.

The crystalline polymer is suitably selected depending on the intended purpose without any restriction, and examples thereof include polyalkylene, polyester, polyamide, polyether, and liquid crystalline polymer. Specific examples of the crystalline polymer include polyethylene, polypropylene, nylon, polyacetal, polybutylene terephthalate, polyethylene terephthalate, syndiotactic polystyrene, polyphenylene sulfide, polyether ether ketone, wholly aromatic polyamide, wholly aromatic polyester, fluororesin, and polyether nitrile.

Among them, polyalkylene (e.g. polyethylene and polypropylene) is preferable, fluoropolyalkylene in which a hydrogen atom of the alkylene group in polyalkylene is partially or wholly substituted with a fluorine atom is more preferable, and polytetrafluoroethylene (PTFE) is particularly preferable, as they have desirable chemical resistance and handling properties.

The polyethylene varies in its density depending on the branching degree thereof and generally classified into low-density polyethylene (LDPE) that has a high branching degree and low crystallinity, and high-density polyethylene (HDPE) that has a low branching degree and high crystallinity. Both LDPE and HDPE can be used in the present invention. Among them, HDPE is particularly preferable in light of the easiness of the crystallinity control.

As the aforementioned polytetrafluoroethylene, polytetrafluoroethylene prepared by emulsification polymerization can be generally used, and use of powdery polytetrafluoroethylene obtained by the coagulation of the aqueous dispersion liquid obtained by the emulsification polymerization is preferable.

The polytetrafluoroethylene is suitably selected depending on the intended purpose without any restriction. For example, commercially available products of polytetrafluoroethylene can be used. Examples of such commercial products include: POLYFLON PTFE F-104, POLYFLON PTFE F-106, POLYFLON PTFE F-201, POLYFLON PTFE F-205, POLYFLON PTFE F-207, POLYFLON PTFE F-301, POLYFLON PTFE F-302, LUBRON L-2, and LUBRON L-5 (all manufactured by DAIKIN INDUSTRIES, LTD.); FLUON PTFE CD1, FLUON PTFE CD141, FLUON PTFE CD145, FLUON PTFE CD123, FLUON PTFE CD076, and FLUON PTFE CD090 (all manufactured by ASAHI GLASS CO., LTD.); and Teflon® PTFE 6-J, Teflon® PTFE 62XT, Teflon® PTFE 6C-J, and Teflon® PTFE 640-J (all manufactured by DU PONT-MITSUI FLUOROCHEMICALS COMPANY, LTD.). Among them, F-104, F-106, F-205, F-302, L-5, CD1, CD141, CD145, CD123, and 6-J are preferable, F-104, F-106, F-205, F-302, L-5, CD1, CD123, and 6-J are more preferable, and F-106, F-205, F-302, L-5, CD1, and CD123 are even more preferable.

The glass-transition temperature of the crystalline polymer is suitably selected depending on the intended purpose without any restriction, but it is preferably −100° C. to 400° C., more preferably −90° C. to 350° C.

The mass average molecular weight of the crystalline polymer is suitably selected depending on the intended purpose without any restriction, but it is preferably in the range of 1,000 to 100,000,000.

The number average molecular weight of each crystalline polymer is suitably selected depending on the intended purpose without any restriction, but it is preferably 500 to 50,000,000, more preferably 1,000 to 25,000,000.

The number average molecular weight can be measured, for example, by gel permeation chromatography (GPC). Since PTFE is insoluble to a solvent, however, it is preferred that the number average molecular weight thereof be measured by measuring heat of crystallization [ΔHc (cal/g)] and calculating using the measured value in the relational expression: $Mn=2.1\times10^{10}\times\Delta Hc^{-5.16}$.

The total thickness of the crystalline polymer microporous membrane is suitably selected depending on the intended purpose without any restriction, but it is preferably 1 μm to 300 μm, more preferably 5 μm to 200 μm, and even more preferably 10 μm to 100 μm.

The maximum thickness of the layer containing the first crystalline polymer (i.e., high crystalline polymer) is suitably selected depending on the intended purpose without any restriction, provided that it is thicker than the maximum thickness of the layer containing the second crystalline polymer (i.e., low crystalline polymer), but it is preferably 1.2 times or more, more preferably 1.25 times or more, and even more preferably 1.5 times or more thicker than the maximum thickness of the layer containing the second crystalline polymer (i.e., low crystalline polymer).

When the maximum thickness of the layer containing the high crystalline polymer is less than 1.2 times the maximum thickness of the layer containing the low crystalline polymer, the low crystalline polymer layer tends to receive influences from frictions and scratches, and thus the fine particle capturing performance of the resulting membrane may not be stably maintained. When the maximum thickness of the layer containing the high crystalline polymer is within the even more preferable range, it is advantageous in light of the fine particle capturing performance.

Note that in the case where an intermediate layer containing both a high crystalline polymer and a low crystalline polymer is present at an interface of each layer, the intermediate layer is not classified as neither of the layer containing the first crystalline polymer (i.e., high crystalline polymer) nor the layer containing the second crystalline polymer (i.e., crystalline polymer).

<<Layer Containing First Crystalline Polymer (High Crystalline Polymer)>>

The layer containing the first crystalline polymer (i.e., high crystalline polymer) is suitably selected depending on the intended purpose without any restriction, provided that it contains the first crystalline polymer (i.e., high crystalline polymer).

The maximum thickness of the layer containing the first crystalline polymer (i.e., crystalline polymer) is thicker than the maximum thickness of the layer containing the second crystalline polymer (i.e., low crystalline polymer). By adjusting the thicknesses of the layers in this manner, the flow rate of the crystalline polymer microporous membrane can be improved.

Here, "the maximum thickness" means the largest value of the thickness among thicknesses of all the layers. For example, in the case where the laminate includes the 20 μm-thick layer containing the first crystalline polymer (i.e., high crystalline polymer), the 15 μm-thick layer containing the first crystalline polymer (i.e., high crystalline polymer), and the 10 μm-thick layer containing the first crystalline polymer (high crystalline polymer), the maximum thickness of the layer containing the first crystalline polymer (i.e., high crystalline polymer) is 20 μm. In the case where the laminate includes the 20 μm-thick layer containing the second crystalline polymer (i.e., low crystalline polymer), the 15 μm-thick second crystalline polymer (i.e., low crystalline polymer), and the 10 μm-thick second crystalline polymer (i.e., low crystalline polymer), the maximum thickness of the second crystalline polymer (i.e., low crystalline polymer) is 20 μm.

The thickness of the layer containing the first crystalline polymer (i.e., high crystalline polymer) is suitably selected depending on the intended purpose without any restriction, but it is preferably 1.0 μm to 100 μm, more preferably 1.25 μm to 75 μm, and even more preferably 1.5 μm to 50 μm.

When the thickness of the layer containing the first crystalline polymer (i.e., high crystalline polymer) is less than 1.0 μm, the low crystalline polymer layer tends to receive influences from frictions and scratches, and thus the fine particle capturing performance of the resulting membrane may not be stably maintained. When the thickness of the layer containing the first crystalline polymer is more than 100 μm, the resulting membrane may not have a sufficient flow rate. When the thickness of the layer containing first crystalline polymer (i.e., high crystalline polymer) is within the aforementioned even more preferable range, it is advantageous in light of the fine particle capturing performance and flow rate.

In the case where the crystalline polymer microporous membrane has a two-layer structure, the ratio of the thickness of the layer containing the first crystalline polymer (i.e., high crystalline polymer) to the thickness of the layer containing the second crystalline polymer (i.e., low crystalline polymer) is preferably 10,000/1 to 1.2/1, more preferably 5,000/1 to 1.25/1, and even more preferably 1,000/1 to 1.5/1.

When the ratio is more than 10,000/1, the thickness of the low crystalline polymer layer may not be controlled with precision. When the ratio is less than 1.2/1, the low crystalline polymer layer tends to receive influences from frictions and scratches, and thus the fine particle capturing performance of the resulting membrane may not be stably maintained. When the ratio is within the aforementioned even more preferable range, it is advantageous in view of the film thickness control and fine particle capturing performance.

In the case where the crystalline polymer microporous membrane has a three-layer structure where one layer of the second crystalline polymer (i.e., low crystalline polymer) is provided between two layers each containing the first crystalline polymer (i.e., high crystalline polymer), the ratio of the maximum thickness of the layer containing the first crystalline polymer (i.e., high crystalline polymer) to the layer containing the second crystalline polymer (i.e., low crystalline polymer) is preferably 5,000/1 to 1.2/1, more preferably 2,500/1 to 1.25/1, and even more preferably 1,000/1 to 1.5/1.

When this ratio is more than 5,000/1, there may be a possibility that the thickness of the layer containing the low crystalline polymer cannot be accurately controlled. When the ratio is less than 1.2/1, the layer containing the low crystalline polymer suffers from frictions or scratches, and thus the resulting membrane may not be able to stably maintain its capturing ability of fine particles. When the ratio is within the aforementioned even more preferable range, it is advantageous because the desirable film thickness control and capturing ability of fine particles can be attained.

The thickness of the other layer (i.e. the layer other than the layer having the maximum thickness) within the two layers each containing the first crystalline polymer (i.e., high crystalline polymer) is suitably selected depending on the intended purpose without any restriction, but it is preferably equal to or thinner than the thickness of the layer containing the second crystalline polymer.

When the thickness thereof is thicker than the thickness of the layer containing the second crystalline polymer, the flow rate of the resulting membrane may not be sufficient. When the thickness thereof is within the aforementioned preferable range, it is advantageous because the desirable flow rate can be attained.

Here, a thickness of each layer can be measured for example by freezing and fracturing the microporous membrane and observing the cross-section thereof under a scanning electron microscope (SEM).

—First Crystalline Polymer (i.e., High Crystalline Polymer)—

The first crystalline polymer (i.e., high crystalline polymer) is suitably selected depending on the intended purpose without any restriction, provided that it is a crystalline polymer having the higher degree of crystallinity than that of the low crystalline polymer described later. The first crystalline polymer is preferably polytetrafluoroethylene (PTFE) because of its desirable chemical resistance.

The crystallinity of the first crystalline polymer (i.e., high crystalline polymer) is suitably selected depending on the intended purpose without any restriction, provided that it is higher than the crystallinity of the second crystalline polymer (i.e., low crystalline polymer) described later, but it is preferably 1.02 or more times, more preferably 1.03 or more times, and even more preferably 1.05 or more times the crystallinity of the second crystalline polymer (i.e., low crystalline polymer).

When the degree of crystallinity of the first crystalline polymer (i.e., high crystalline polymer) is less than 1.02 times the crystallinity of the second crystalline polymer (i.e., low crystalline polymer), the pore diameters in the high crystalline polymer layer and those in the low crystalline polymer layer become similar, and thus fine particles may not be efficiently captured by the resulting membrane. When the crystallinity of the first crystalline polymer (i.e., high crystalline polymer) is within the aforementioned even more preferable range, it is advantageous in view of the fine particle capturing performance.

Note that, the "crystallinity" can be determined by the following formula:

$$\frac{1}{\rho} = \frac{C}{\rho_c} + \frac{1-C}{\rho_a}$$

In the formula above, 100C denotes crystallinity (%), $\rho$ denotes a density of a sample, $\rho_a$ denotes a density of a perfect crystal (in the case of PTFE, 2.302), and $\rho_c$ denotes a density of amorphous (in the case of PTFE, 2.060). The density of the sample can be measured by a dry-type or wet-type densitometer, density gradient tube, or the like, such as ACCUPYC II 1340, and ACCUPYC 1330, both manufactured by Shimadzu Corporation.

Moreover, the degree of crystallinity can be measured, for example, by wide angle X-ray diffraction, NMR, infrared (IR) spectroscopy, DSC, or the method described in page 45 of "Fluororesin Handbook" (edited by Takaomi Satokawa, published by Nikkan Kogyo Shinbun, Ltd.).

<<Layer Containing Second Crystalline Polymer (i.e., Low Crystalline Polymer)>>

The layer containing the second crystalline polymer (i.e., low crystalline polymer) is suitably selected depending on the intended purpose without any restriction, provided that it contains the second crystalline polymer (i.e., low crystalline polymer).

The maximum thickness of the layer containing the second crystalline polymer (i.e., low crystalline polymer) is thinner than the maximum thickness of the layer containing the first crystalline polymer (i.e., high crystalline polymer). By adjusting the thicknesses of the layers in this manner, the flow rate of the resulting crystalline polymer microporous membrane can be improved.

The thickness of the layer containing the second crystalline polymer (i.e., low crystalline polymer) is suitably selected depending on the intended purpose without any restriction, but it is preferably 0.01 µm to 100 µm, more preferably 0.02 µm to 80 µm, and even more preferably 0.03 µm to 60 µm.

When the thickness of the layer containing the second crystalline polymer (i.e., low crystalline polymer) is less than 0.01 µm, uniformity of the pore diameters may be disturbed within the plane. When the thickness thereof is more than 100 µm, the resulting membrane may not have a high flow rate. When the thickness of the layer containing the second crystalline polymer (i.e., low crystalline polymer) is within the aforementioned even more preferable range, it is advantageous in view of the obtainable uniformity of pore size on the entire surface and flow rate.

—Second Crystalline Polymer (i.e., Low Crystalline Polymer)—

The second crystalline polymer (i.e., low crystalline polymer) is suitably selected depending on the intended purpose without any restriction, provided that it is a crystalline polymer having the degree of crystallinity lower than that of the first crystalline polymer (i.e., high crystalline polymer), but it is preferably polytetrafluoroethylene (PTFE), or a polytetrafluoroethylene copolymer, in view of its desirable chemical resistance.

The polytetrafluoroethylene copolymer is suitably selected depending on the intended purpose without any restriction. Examples thereof include copolymers each containing at least two polymer components selected from tetrafluoroethylene, perfluoroalkylvinyl ether, hexafluoropropylene, and chlorotrifluoroethylene, such as a tetrafluoroethylene-perfluoroalkylvinyl ether copolymer, a tetrafluoroethylene-hexafluoropropylene copolymer, and a tetrafluoroethylene-ethylene copolymer.

<Method for Producing Crystalline Polymer Microporous Membrane>

The method for producing a crystalline polymer microporous membrane of the present invention contains at least an unbaked film laminate forming step, an asymmetric heating step, a drawing step, and a heat setting step, and may further contain other steps, if necessary.

<<Unbaked Film Laminate Forming Step>>

The unbaked film laminate forming step includes: laminating a layer containing a first crystalline polymer (i.e. high crystalline polymer) and a layer containing a second crystalline polymer (i.e. low crystalline polymer) to form an unbaked film laminate of two or more layers.

The first crystalline polymer (i.e. high crystalline polymer) and the second crystalline polymer (i.e. low crystalline polymer) each having a mutually different crystallinity are suitably selected from those described earlier depending on the intended purpose.

The laminate forming step is suitably carried out in accordance with the conventional paste extrusion method, without any restriction.

At first, each crystalline polymer is mixed with an extrusion aid to prepare a mixture (i.e. a paste), and two or more layers of pastes are laminated to form a preforming body. Then, the preforming body is subjected to rolling to prepare an unbaked multilayer crystalline polymer film (i.e. unbaked film laminate). As the extrusion aid, a fluid lubricant is preferably used, and examples of such fluid lubricant include solvent naptha, liquid paraffin, and the like. Moreover, as the extrusion aid, commercial products can be used. For example, hydrocarbon oil such as ISOPAR, manufactured by Esso Sekiyu K.K. may be used the commercial product of the extrusion aid. The amount of the extrusion aid for use is preferably 15 parts by mass to 30 parts by mass relative to 100 parts by mass of the crystalline polymer.

The extrusion of the paste is preferably performed at the temperature of 19° C. to 200° C. The shape of extrusion body is suitably selected depending on the intended purpose without any restriction, but it is generally preferably a rod shape or sheet shape, more preferably a sheet shape. The extrusion body is then subjected to rolling to form into a film. For example, the rolling can be performed by calendering at the speed of 5 m/min using a calendar roller. The temperature for the rolling is generally set at 19° C. to 380° C. After the rolling, the film is heated to remove the extrusion aid to thereby form an unbaked multilayer crystalline polymer film. The heating temperature for this can be suitably selected depending on the extrusion aid for use, but it is preferably 40° C. to 400° C., more preferably 60° C. to 350° C. In the case where polytetrafluoroethylene is used as the crystalline polymer and from which solvent naphtha is removed, for example, the heating temperature is preferably 150° C. to 280° C., and more preferably 180° C. to 260° C. The heating can be performed by the method in which the film is passed through a hot-blast drying oven. The thickness of the unbaked multilayer crystalline polymer film produced in this manner can be appropriately adjusted depending on the intended thickness of the crystalline polymer microporous membrane to be produced as a final product. In the case where drawing will be performed in the later step, it is also necessary to adjust the thickness of the unbaked multilayer crystalline polymer film with consideration of the reduction in the thickness during the drawing.

For the production of the unbaked multilayer crystalline polymer film, the descriptions in "Polyflon Handbook" (published by DAIKIN INDUSTRIES, LTD., Revised Edition of the year 1983) may be suitably used as a reference, and applied.

One example of the method for producing a crystalline polymer microporous membrane of the present invention will be explained with reference to FIGS. 5 to 8.

Figure 7:
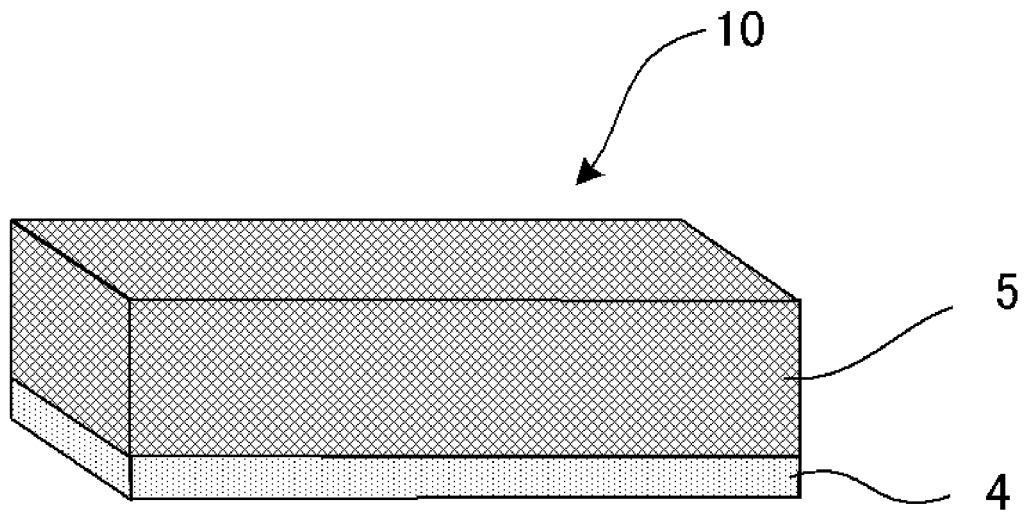
FIG. 7 is a diagram showing one example of a preforming body.

As shown in FIG. 7, a preforming body 10 consisted of a first layer 4 containing PTFE fine powder 1 and a second layer 5 containing PTFE fine powder 2 is prepared.

These layers are respectively made of a Paste 1 and Paste 2, in each of which a fluid lubricant, such as solvent naptha, and liquid paraffin, is added to fine PTFE powder that has been prepared by flocculation of a PTFE emulsified polymerization aqueous dispersion liquid having the average primary particle diameter of 0.2 μm to 0.4 μm. The amount of the fluid lubricant for use is varied depending on the lubricant for use, conditions for molding, and the like, but it is generally 15 parts by mass to 35 parts by mass relative to 100 parts by mass of the fine PTFE powder. If necessary, a colorant can be further added to form the preforming body.

Figure 5:
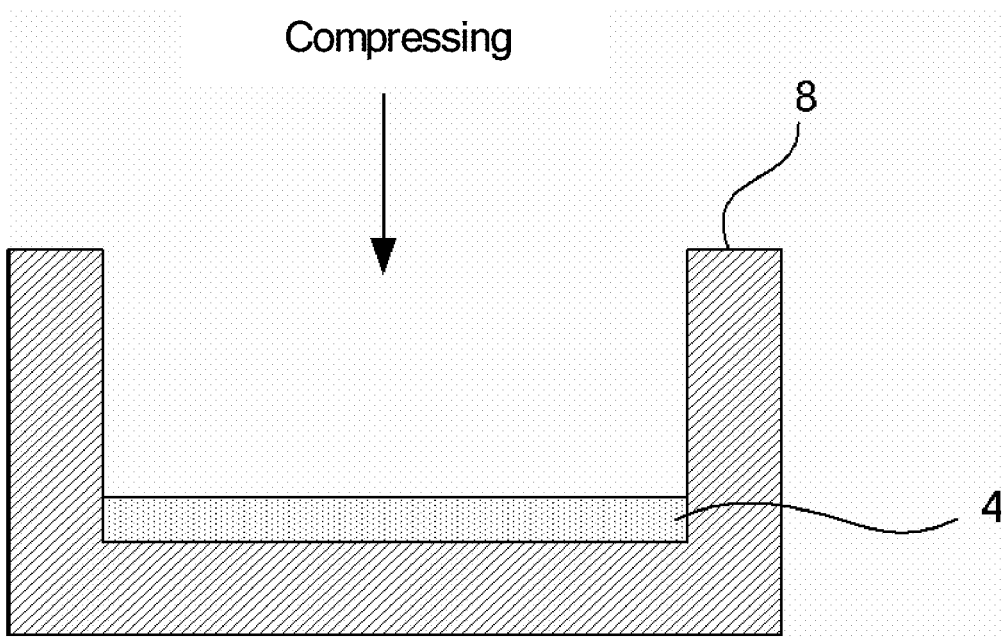
FIG. 5 is a diagram showing a process of a method for producing the crystalline polymer microporous membrane of the present invention.

At first, Paste 1 containing the PTFE fine powder 1 for forming the first layer is placed in a box-shaped bottom metal mold 8 as illustrated in FIG. 5 to give a layer of Paste 1 in the bottom metal mold 8, and then a top metal mold (not shown in the figure) is pressed in the direction shown with the arrow. As a result of this, Paste 1 is compressed to form the first layer 4.

Figure 6:
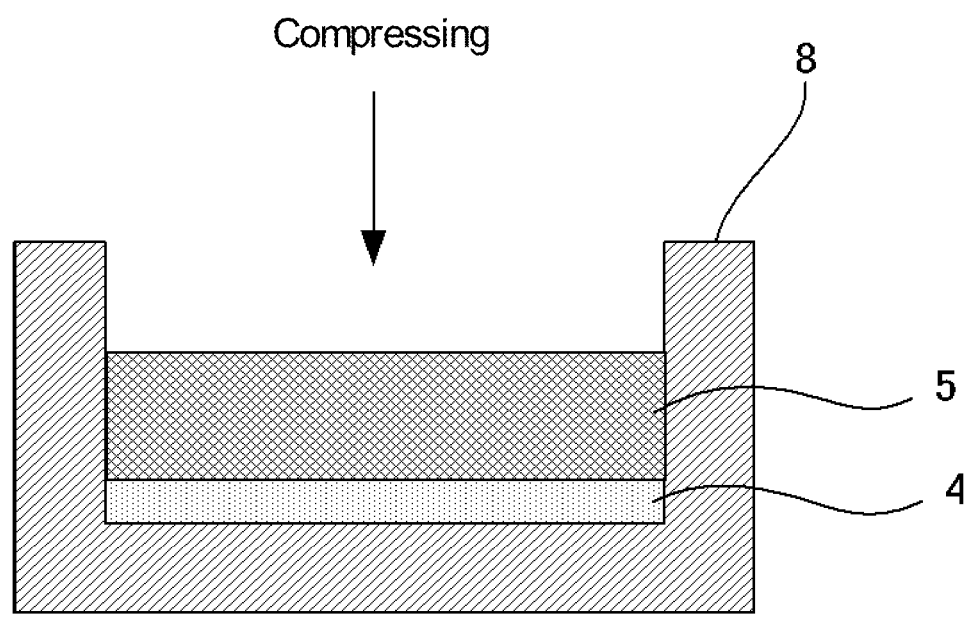
FIG. 6 is a diagram showing another process of a method for producing the crystalling polymer microporous membrane of the present invention.

Next, the top metal mold (not shown in the figure) is removed, and Paste 2 containing the PTFE fine powder 2 for forming the second layer is placed on the first layer 4, and compressed using the top metal mold (not shown in the figure) in the same manner as the above, to thereby form the second layer 5 on the first layer 4 as illustrated in FIG. 6.

In the manner mentioned above, the preforming body 10, which has been shaped in the size to be placed in a cylinder of a paste extruder, as shown in FIG. 7.

Figure 8:
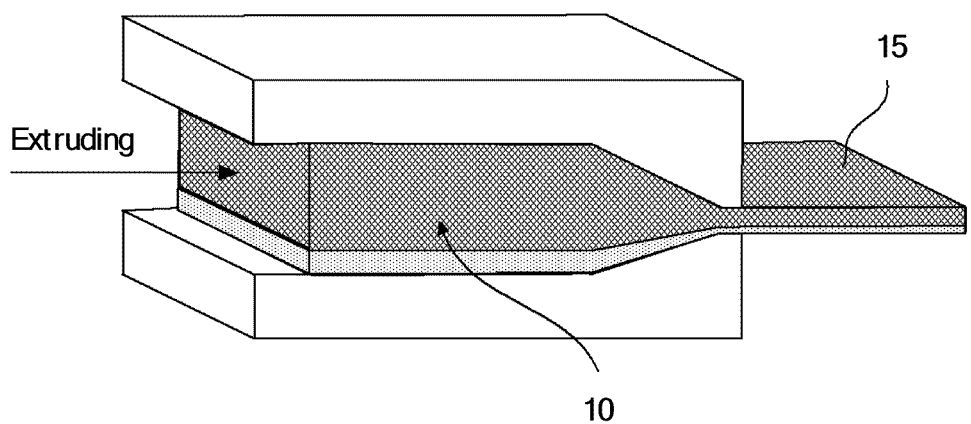
FIG. 8 is a diagram showing another process of a method for producing the crystalline polymer microporous membrane of the present invention.

After placing the obtained preforming body 10 in the cylinder of the paste extruder shown in FIG. 8, the preforming body 10 is extruded in the direction shown with the arrow by means of a compressing member (not shown in the figure). The cylinder of the paste extruder shown in FIG. 8 has for example a rectangular shape in the size of 50 mm×100 mm at the cross-sectional direction that has right-angle to an axis, and a nozzle in the size of 50 mm×5 mm, which is formed by narrowing the outlet end of the cylinder.

In this manner, the first layer 4 and the second layer 5 are completely united to thereby form a precursor 15 of an unbaked multilayer polytetrafluoroethylene film (i.e., an unbaked laminate), each layer of which has a uniform thickness. The thickness ratio of the layers of the laminate is substantially the same as the thickness ratio of the layers of the preforming body, which has been confirmed by a stereoscopic microscope.

<<Asymmetric Heating Step>>

The asymmetric heating step is heating a surface of the unbaked film laminate to perform asymmetric heating to give a temperature gradient in a thickness direction of the unbaked film laminate.

The "a surface of the unbaked film laminate" is suitably selected from surfaces of the unbaked film laminate depending on the intended purpose without any restriction, but it is preferred that the surface of the unbaked film laminate at the side where the layer containing the low crystalline polymer is present be heated. In the case where the layers containing the same material are provided on the both sides of the unbaked film laminate, it is preferred that the side where the thinner layer than the other layer be heated.

Here, "asymmetric heating" means that the unbaked film laminate of two or more layers in which the layer containing the first crystalline polymer (high crystalline polymer) and the layer containing the second crystalline polymer (low crystalline polymer) are laminated is heated at a temperature equal to or higher than the melting point peak of the baked film laminate minus 5° C. (i.e. Tm peak of the baked film laminate −5° C.), and equal to or lower than the melting point peak of the unbaked film laminate plus 15° C. (i.e. Tm peak of the unbaked film laminate +15° C.).

In the present specification, the "unbaked film laminate" means a film laminate which has not been asymmetric heated. Moreover, the melting point of the unbaked film laminate means a peak temperature of the endothermic curve obtained by the measurement using a differential scanning calorimeter. The melting point of the baked film laminate and the melting point of the unbaked film laminate are varied depending on a type, number average molecular weight, or the like of the crystalline polymer for use, but they are each preferably 50° C. to 450° C., more preferably 80° C. to 400° C.

The selection of such temperature range is explained as follows. In the case of polytetrafluoroethylene, for example, the melting point of the baked film laminate is approximately 327° C. and the melting point of the unbaked film laminate is approximately 346° C. Accordingly, to produce a semi-baked film laminate in which the film having the melting point of approximately 327° C. coexists with the film having the melting point of approximately 346° C., in the case of the polytetrafluoroethylene film laminate, the film laminate is preferably heated at 322° C. to 361° C., more preferably 327° C. to 346° C. For example, the film laminate is heated 338° C.

In the asymmetric heating step, the method for applying thermal energy can be either a continuous application, or intermittent application in which thermal energy is dividedly applied in a few times. For asymmetric heating, it is necessary to give a temperature difference between the front surface of the film laminate and the back surface of the film laminate. For this purpose, a method of intermittently applying the energy can be used for preventing the temperature of the back surface from increasing. On the other hand, in the case of the continuous application or discontinuous of the energy, it is effective to use a method of cooling the back surface at the same time as heating the front surface for maintaining the temperature gradient.

The method for applying thermal energy is suitably selected depending on the intended purpose without any restriction. Examples thereof include (1) a method of blowing hot air to the film laminate, (2) a method of bringing the film laminate into contact with a heat medium (3) a method of bringing the film laminate into contact with a heated member, (4) a method of irradiating the film laminate with infrared rays, and (5) a method of heating the film laminate by electromagnetic waves such as microwaves. Among them, (3) the method of bringing the film laminate into contact with a heated member, and (4) the method of irradiating the film laminate with infrared rays are preferable.

The heated member for use in (3) is preferably a heating roller. Use of the heating roller makes it possible to continuously perform asymmetric heating in an assembly-line operation in an industrial manner and makes it easier to control the temperature and maintain the apparatus for use. The temperature of the heating roller can be set to the temperature for forming the semi-baked film laminate. The duration for the contact between the heating roller and the film laminate is the period long enough to sufficiently perform intended asymmetric heating, and it is preferably 1 second to 120 seconds, more preferably 2 seconds to 110 seconds, and even more preferably 3 seconds to 100 seconds.

The aforementioned infrared irradiation (4) is suitably selected depending on the intended purpose without any restriction.

For the general definition of the infrared ray, "Infrared Ray in Practical Use" (published by Ningentorekishisha in 1992) may be referred to. Here, the infrared ray means an electromagnetic wave having a wavelength of 0.74 µm to 1,000 µm. Within this range, an electromagnetic wave having a wavelength of 0.74 µm to 3 µm is defined as a near-infrared ray, and an electromagnetic wave having a wavelength of 3 µm to 1,000 µm is defined as a far-infrared ray.

Since the temperature difference present between the front surface and the back surface of the film laminate is preferable in the present invention, it is desirable to use a far-infrared ray that is advantageous for heating a surface layer.

A device for applying the infrared ray is suitably selected depending on the intended purpose without any restriction, provided that it can apply an infrared ray having a desired wavelength. Generally, an electric bulb (e.g. a halogen lamp) can be used as a device for applying near-infrared rays, while a heating element such as a ceramic, quartz, and metal oxidized surface can be used as a device for applying far-infrared rays.

Also, infrared irradiation enables to continuously perform the asymmetric heating in an assembly-line operation in an industrial manner and makes it easier to control the temperature and maintain the device. Moreover, since the infrared irradiation is performed in a noncontact manner, it is clean and does not allow defects such as pilling to arise.

The temperature of the film surface when irradiated with the infrared ray can be controlled by the output of the infrared irradiation device, the distance between the infrared irradiation device and the film surface, the irradiation time (conveyance speed) and/or the atmospheric temperature, and may be adjusted to the temperature at which the film is semi-baked. The temperature of the film surface is preferably 322° C. to 380° C., more preferably 325° C. to 360° C. When the temperature of the film surface is lower than 322° C., the crystallized state may not change and thus the pore diameter may not be able to be controlled. When the temperature is higher than 380° C., the entire film laminate may melt, thus possibly causing extreme deformation.

The duration for the infrared irradiation is suitably adjusted depending on the intended purpose without any restriction, but it is long enough to perform sufficient semi-baking, preferably 1 second to 120 seconds, more preferably 2 seconds to 110 seconds, and even more preferably 3 seconds to 100 seconds.

The infrared irradiation for the asymmetric heating may be carried out continuously, or intermittently divided into a few times.

As the temperature gradient of the film laminate in the thickness direction thereof, the temperature difference between the front surface and the back surface is preferably 10° C. or higher, more preferably 20° C. or higher.

In the case where the back surface of the film laminate is continuously heated, it is preferred that the front surface be cooled at the same time as heating the back surface to maintain the temperature gradient between the front surface and back surface of the film laminate.

The method for cooling the front surface is suitably selected depending on the intended purpose without any restriction, and various methods can be used. Examples of such method include a method of allowing the front surface to be in contact with a refrigerant, a method of allowing the front surface to be in contact with a cooled material, and a method of standing the front surface to cool. However, a method of allowing the surface of the film laminate to be in contact with a cooling member is not preferable because the surface of the cooling member to be contact is heated by far infrared rays.

In the case where the asymmetric heating step is carried out intermittently, moreover, it is preferred that the back surface of the film laminate be heated and cooled intermittently to prevent the temperature increase on the surface.

<<Drawing Step>>

The drawing step is drawing the semi-baked film laminate in the state where the structure thereof is given by a temperature gradient.

The drawing is preferably performed in the both the length direction and width direction. The film laminate may be drawn in the length direction, followed by drawn in the width direction, or may be drawn in the biaxial direction at the same time.

In the case where the film laminate is sequentially drawn in the length direction and width direction, it is preferred that the film laminate be drawn in the length direction first, then be drawn in the width direction.

The extension rate of the film laminate in the length direction is preferably 1.2 times to 50 times, more preferably 1.5 times to 40 times, and even more preferably 2.0 times to 10 times. The temperature for the drawing in the length direction is preferably 35° C. to 330° C., more preferably 45° C. to 320° C., and even more preferably 55° C. to 310° C.

The extension rate of the film laminate in the width direction is preferably 1.2 times to 50 times, more preferably 1.5 times to 40 times, even more preferably 2.0 times to 30 times, and particularly preferably 2.5 times to 10 times. The temperature for the drawing in the width direction is preferably 35° C. to 330° C., more preferably 45° C. to 315° C., and even more preferably 60° C. to 300° C.

The draw rate of the film laminate in terms of the area thereof is preferably 1.5 times to 2,500 times, more preferably 2 times to 2,000 times, and even more preferably 2.5 times to 100 times. Before the drawing is performed on the film laminate, the film laminate may be pre-heated at the temperature equal to or lower than the temperature for the drawing.

Moreover, heat setting may be performed after drawing, if necessary. The temperature for heat setting is preferably equal to or higher than the temperature for drawing, but the lower than the melting point of the crystalline polymer for use.

In the case where the crystalline polymer is a fluororesin such as PTFE, the heat setting is preferably performed by heating at the temperature equal to or higher than the melting point thereof.

The crystalline polymer microporous membrane of the present invention can be used for various purposes, but it is particularly preferably used as a filtration filter explained below.

(Filtration Filter)

The filtration filter of the present invention contains the crystalline polymer microporous membrane of the present invention.

When the crystalline polymer microporous membrane of the present invention is arranged as a filtration filter, the A surface of the membrane (i.e., the surface thereof having the larger average pore diameter than that of the other surface) faces the inlet side to perform filtration. By using the surface having the larger average pore diameter (i.e. the A surface of the membrane) for the inlet side to perform filtration, particles can efficiently captured.

Moreover, since the crystalline polymer microporous membrane of the present invention has a large specific surface area, fine particles introduced from such surface are removed by absorption or deposition before they reach the portion of the minimum pore diameter. Accordingly, the filtration filter can maintain its high filtration efficiency for long period of time while preventing clogging.

The filtration filter of the present invention is preferably processed into a pleated form. By arranging the filtration filter in the pleated form, the effective surface area of the filter per cartridge can be increased.

Figure 9:
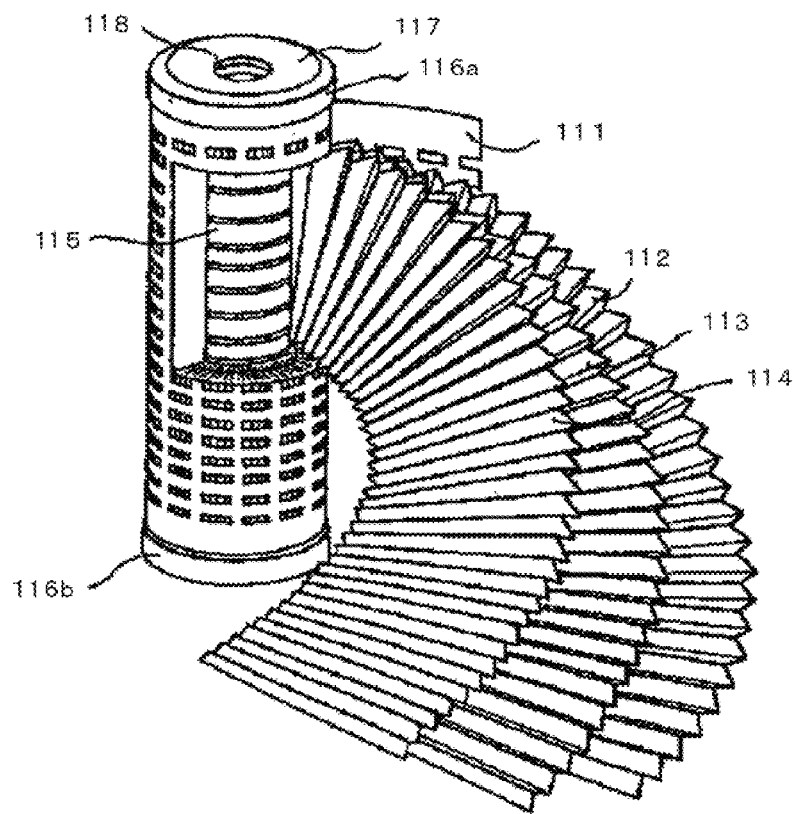
FIG. 9 is a diagram showing a common structure of a pleated filter element before mounted in a housing.

FIG. 9 is a developed view showing a structure of an element-exchange type pleated filter cartridge element. Sandwiched between two membrane supports 112 and 114, a microfiltration membrane 113 is corrugated and wound around a core 115 having multiple liquid-collecting slots, and a cylindrical object is thus formed. An outer circumferential cover 111 is provided outside the foregoing members so as to protect the microfiltration membrane. At both ends of the cylindrical object, the microfiltration membrane is sealed with end plates 116a and 116b. The end plates are connected to a sealing portion of a filter housing (not shown), with a gasket 117 placed in between. A filtered liquid is collected through the liquid-collecting slots of the core and discharged from a fluid outlet 118.

Figure 10:
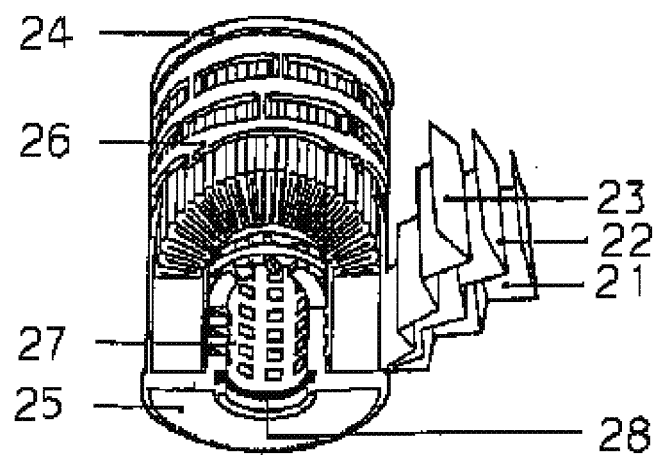
FIG. 10 is a diagram showing a common structure of a filter element before mounted in a housing of a capsule filter cartridge.
Figure 11:
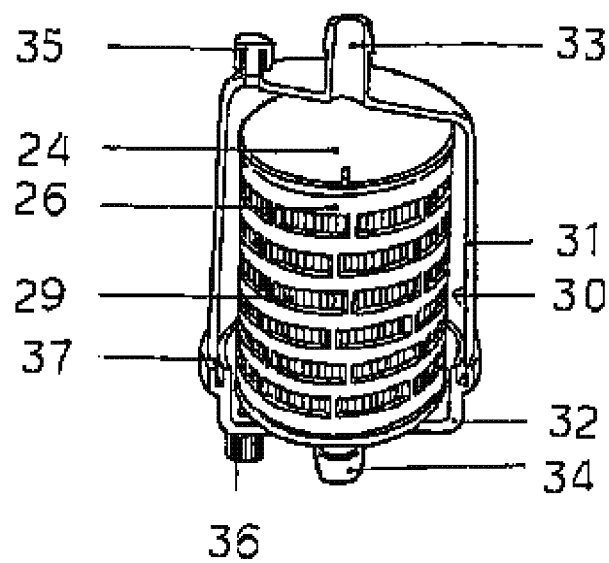
FIG. 11 is a diagram showing a common structure of a capsule filter cartridge integrated with a housing.

Capsule-type pleated cartridges are shown in FIGS. 10 and 11.

FIG. 10 is a developed view showing the overall structure of a microfiltration membrane filter element before installed in a housing of a capsule-type cartridge. Sandwiched between two supports 21 and 23, a microfiltration membrane 22 is corrugated and wound around a filter element core 27 having multiple liquid-collecting slots, and a cylindrical object is thus formed. A filter element cover 26 is provided outside the foregoing members so as to protect the microfiltration membrane. At both ends of the cylindrical object, the microfiltration membrane 22 is sealed with an upper end plate 24 and a lower end plate 25.

FIG. 11 shows the structure of a capsule-type pleated cartridge in which the filter element 30 has been installed in a housing so as to form a single unit. The lower end plate is connected in a sealed manner to a water-collecting tube (not shown) at the center of the housing base by means of an O-shaped ring 28. A liquid enters the housing from a liquid inlet nozzle and passes through a filter medium 29, then the liquid is collected through the liquid-collecting slots of the filter element core 27 and discharged from a liquid outlet nozzle 34. In general, the housing base and the housing cover are thermally fused in a liquid-tight manner at a fusing portion 37.

FIG. 10 shows an instance where the lower end plate and the housing base are connected in a sealed manner by means of the O-shaped ring. It should be noted that the lower end plate and the housing base may be connected in a sealed manner by thermal fusing or with an adhesive. Also, the housing base and the housing cover may be connected in a sealed manner with an adhesive as well as by thermal fusing. FIGS. 9 to 11 show specific examples of microfiltration cartridges, and note that the present invention is not confined to the examples shown in these drawings.

Having a high filtering function and long lifetime as described above, the filtration filter of the present invention enables a filtration device to be compact. In a conventional filtration device, multiple filtration units are used in parallel so as to offset the short filtration life; use of the filter of the present invention for filtration makes it possible to greatly reduce the number of filtration units used in parallel. Furthermore, since it is possible to greatly lengthen the period of time for which the filter can be used without replacement, it is possible to cut costs and time necessary for maintenance.

The filtration filter of the present invention can be used in a variety of situations where filtration is required, notably in microfiltration of gases, liquids, etc. For instance, the filter can be used for filtration of corrosive gases and gases for use in the semiconductor industry, and filtration and sterilization of cleaning water for use in the electronics industry, water for medical uses, water for pharmaceutical production processes and water for foods and drinks. It should be particularly noted that since the filtration filter of the present invention is superior in heat resistance and chemical resistance, the filtration filter can be effectively used for high-temperature filtration and filtration of reactive chemicals, for which conventional filters cannot be suitably used.

EXAMPLES

Examples of the present invention will be explained hereinafter, but these examples shall not be construed as limiting to the scope of the present invention in any way.

Example 1

Preparation of Microporous Membrane

—Preparation of Preforming Body—

To 100 parts by mass of polytetrafluoroethylene fine powder (F106, manufactured by DAIKIN INDUSTRIES, LTD., crystallinity: 98.5%) serving as a high crystalline polymer, 23 parts by mass of hydrocarbon oil (ISOPAR H, manufactured by Esso Sekiyu K.K.) serving as an extrusion aid was added to prepare Paste 1.

To 100 parts by mass of polytetrafluoroethylene fine powder (F205, manufactured by DAIKIN INDUSTRIES, LTD., crystallinity: 93.7%) serving as low crystalline polymer, 20 parts by mass of hydrocarbon oil (ISOPAR H, manufactured by Esso Sekiyu K.K.) serving as an extrusion aid was added to prepare Paste 2.

Then, Paste 1 and Paste 2 were laid to have a thickness ratio (the thickness of Paste 1/the thickness of Paste 2/the thickness of Paste 1) of 2/1/2 and compressed to prepare a preforming body of three-layer structure.

Note that, the crystallinity of the preforming body was measured in the following manners.

—Measuring Method of Crystallinity—

The crystallinity of the preforming body was measured by means of ACCUPYC 1330 manufactured by Shimadzu Corporation.

The measuring sample of the preforming body was stored in a low humidity storage having the temperature of 25° C. and the relative humidity of 1% RH 24 hours before the measurement to prevent absorption of moisture. As an amount of the preforming body used as a sample for the measurement, the preforming body was weighted to have a weight ranging from 0.1 g to 1.0 g. In the case where the measuring sample was in the form of a film, the measurement of the sample could be performed by rolling the sample put to form a rod sample having a width of 8 mm and length of a few centimeters to about twenty centimeters, and placing the rod sample in a sample tube.

—Preparation of Unbaked Film—

The prepared Preforming Body was inserted in a square cylinder of a paste extrusion metal mold, and was extruded into a sheet to perform a multilayer paste extrusion. The resuled extrusion body was subjected to calendering by a calendering roller heated at 60° C. to prepare a multilayer polytetrafluoroethylene film. The obtained multilayer polytetrafluoroethylene film was passed through a hot drying hearth having the temperature of 250° C. to dry and remove the extrusion aid, to thereby prepare an unbaked multilayer polytetrafluoroethylene film having an average thickness of 100 μm, an average width of 250 mm, and specific gravity of 1.45.

—Preparation of Semi-Baked Film—

One surface of the obtained unbaked multilayer polytetrafluoroethylene film was heated for 30 seconds by a roller (surface material: SUS316) whose temperature was maintained at 338° C. to prepare a semi-baked film.

—Preparation of Polytetrafluoroethylene Microporous Membrane—

The obtained semi-baked film was passed through between rollers at 150° C. to draw 3 times the length in the length direction, and the drawn film was wound up around a wind roll. Thereafter, the both edges of the drawn film were nipped with clips to draw 3 times the length in the width direction at 200° C. Thereafter, the drawn film was subjected to heat setting at 380° C. The drawn rate of the obtained polytetrafluoroethylene microporous membrane in terms of the area was 9.0 times. In the manner as described, a polytetrafluoroethylene microporous membrane of Example 1 was prepared.

The fact that the obtained polytetrafluoroethylene microporous membrane has a plurality of pores whose average pore diameter was continuously or discontinuously changed in the thickness direction of each layer was confirmed by freezing the prepared microporous membrane, cutting the frozen membrane, and observing the cross-section of the cut membrane under a scanning electron microscope (SEM)(Hitachi S-4700, manufactured by Hitachi, Ltd.). This confirmation was performed in the same manner in Examples 2 to 6.

Example 2

Preparation of Microporous Membrane

A polytetrafluoroethylene microporous membrane of Example 2 was prepared in the same manner as in Example 1, provided that instead of laying and compressing Paste 1 and Paste 2 to have a thickness ratio (the thickness of Paste 1/the thickness of Paste 2/the thickness of Paste 1) of 2/1/2 to thereby form the preforming body of three-layer structure, Paste 1 and Paste 2 were laid and compressed to have a thickness ratio (the thickness of Paste 1/the thickness of Paste 2) of 4/1 to thereby a preforming body of two-layer structure; and instead of heating the obtained unbaked multilayer polytetrafluoroethylene film for 30 seconds by the roller (surface material: SUS316) whose temperature was maintained at 338° C., the surface of the unbaked multilayer polytetrafluoroethylene film at the side of Paste 2 was heated at the film surface temperature of 340° C. for 1 minute by near infrared rays emitted from a halogen heater to which a tungsten filament was built in. Note that, the heated surface during the asymmetric heating in Example 2 was the side where Paste 2 was present.

Example 3

Preparation of Microporous Membrane

A polytetrafluoroethylene microporous membrane of Example 3 was prepared in the same manner as in Example 1, provided that instead of laying and compressing Paste 1 and Paste 2 to have a thickness ratio (the thickness of Paste 1/the thickness of Paste 2/the thickness of Paste 1) of 2/1/2 to thereby form the preforming body of three-layer structure, Paste 1 and Paste 2 were laid and compressed to have a thickness ratio (the thickness of Paste 1/the thickness of Paste 2/the thickness of Paste 1) of 3/1/1 to thereby a preforming body of three-layer structure. Note that, the heated surface during the asymmetric heating in Example 3 was the side where the thinner Paste 1 having was present.

Example 4

Preparation of Microporous Membrane

A polytetrafluoroethylene microporous membrane of Example 4 was prepared in the same manner as in Example 1, provided that instead of laying and compressing Paste 1 and Paste 2 to have a thickness ratio (the thickness of Paste 1/the thickness of Paste 2/the thickness of Paste 1) of 2/1/2 to thereby form the preforming body of three-layer structure, Paste 1 and Paste 2 were laid and compressed to have a thickness ratio (the thickness of Paste 1/the thickness of Paste 2/the thickness of Paste 1) of 2.0/0.5/1.0 to thereby a preforming body of three-layer structure. Note that, the heated surface during the asymmetric heating in Example 4 was the side where the thinner Paste 1 having was present.

Example 5

Preparation of Microporous Membrane

A polytetrafluoroethylene microporous membrane of Example 5 was prepared in the same manner as in Example 1, provided that instead of using F106 manufactured by DAIKIN INDUSTRIES, LTD. as the high crystalline polymer, CD123 (crystallinity: 98.7%), manufactured by ASAHI GLASS CO., LTD. was used as the high crystalline polymer.

Example 6

A polytetrafluoroethylene microporous membrane of Example 6 was prepared in the same manner as in Example 1, provided that instead of using F205 manufactured by DAIKIN INDUSTRIES, LTD. as the low crystalline polymer, F201 (crystallinity: 93.1%) manufactured by DAIKIN INDUSTRIES, LTD. was used as the low crystalline polymer.

Comparative Example 1

Preparation of Microporous Membrane

A polytetrafluoroethylene microporous membrane of Comparative Example 1 was prepared in the same manner as in Example 1, provided that the asymmetric heating treatment was not performed on the unbaked multilayer polytetrafluoroethylene film.

Comparative Example 2

Preparation of Microporous Membrane

A polytetrafluoroethylene microporous membrane of Comparative Example 2 was prepared in the same manner as in Example 1, provided that instead of laying and compressing Paste 1 and Paste 2 to have a thickness ratio (the thickness of Paste 1/the thickness of Paste 2/the thickness of Paste 1) of 2/1/2 to thereby form the preforming body of three-layer structure, Paste 1 and Paste 2 were laid and compressed to have a thickness ratio (the thickness of Paste 2/the thickness of Paste 1) of 4/1 to thereby a preforming body of two-layer structure. Note that, the heated surface during the asymmetric heating in Comparative Example 2 was the side where Paste 1 was present.

Comparative Example 3

Preparation of Microporous Membrane

A polytetrafluoroethylene microporous membrane of Comparative Example 3 was prepared in the same manner as in Example 1, provided that instead of laying and compressing Paste 1 and Paste 2 to have a thickness ratio (the thickness of Paste 1/the thickness of Paste 2/the thickness of Paste 1) of 2/1/2 to thereby form the preforming body of three-layer structure, Paste 1 and Paste 2 were laid and compressed to have a thickness ratio (the thickness of Paste 2/the thickness of Paste 1/the thickness of Paste 2, in the order from the front surface to the back surface) of 3/1/1 to thereby a preforming body of three-layer structure. Note that, the heated surface during the asymmetric heating in Comparative Example 3 was the side where the thinner Paste 2 was present.

Since the layer containing the low crystalline polymer was provided the outer side of the microporous membrane, in Comparative Example 3, there were problems such that the microporous membrane was torn as well as sticking to the roller during the asymmetric heating.

The prepared microporous membranes of Examples 1 to 6, and Comparative Examples 1 to 3 were each subjected to confirmation of "formation of a plurality of pores piercing through in the thickness direction", measurements of thickness of each layer, measurements of diameters of pores in the layer at the non-heated side, filtration test, flow rate test, durability test, and curl test.

<Confirmation of "Formation of a Plurality of Pores Piercing Through in the Thickness Direction">

The "formation of a plurality of pores piercing through in the thickness direction" was confirmed by freezing each microporous membrane, cut the frozen membrane, and observing the cross-section of the cut membrane under a scanning electron microscope (SEM)(Hitachi S-4700, manufactured by Hitachi, Ltd.).

<Measurement of Thickness of Each Layer>

Microporous membranes of Example 1 to 6, and Comparative Example 1 to 3 were each frozen, and cut. Then, the cross-section of the cut membrane was observed under a scanning electron microscope (SEM)(Hitachi S-4700, manufactured by Hitachi, Ltd.) to measure a thickness of each layer. The results are shown in Table 1.

Note that, in the case where an intermediate layer containing the high crystalline polymer and the low crystalline polymer was present at an interface of layers, the intermediate layer was categorized neither as the layer containing the high crystalline polymer, nor as the layer containing the low crystalline polymer.

TABLE 1

|  | Nonheated surface side | | | | Heated surface side | |
|---|---|---|---|---|---|---|
|  | Polymer | Thickness (μm) | Polymer | Thickness (μm) | Polymer | Thickness (μm) |
| Ex. 1 | F106 | 28 | F205 | 15 | F106 | 28 |
| Ex. 2 | F106 | 54 | — | — | F205 | 14 |
| Ex. 3 | F106 | 42 | F205 | 15 | F106 | 14 |
| Ex. 4 | F106 | 40 | F205 | 10 | F106 | 21 |
| Ex. 5 | CD123 | 29 | F205 | 15 | CD123 | 29 |
| Ex. 6 | F106 | 29 | F201 | 14 | F106 | 29 |
| Comp. Ex. 1 | F106 | 29 | F205 | 16 | F106 | 29 |
| Comp. Ex. 2 | F205 | 52 | — | — | F106 | 14 |
| Comp. Ex. 3 | F205 | 41 | F106 | 13 | F205 | 14 |

<Measurement of Pore Diameter of Membrane>

The most frequent value of the pore diameter of each of the crystalline polymer microporous membranes of Examples 1 to 6, and Comparative Examples 1 to 3 was measured by means of Perm-Porometer manufactured by Porous Materials, Inc. The results are shown in Table 2.

TABLE 2

|  | Pore diameter (μm) | Membrane thickness (μm) |
| --- | --- | --- |
| Ex. 1 | 0.037 | 71 |
| Ex. 2 | 0.051 | 68 |
| Ex. 3 | 0.052 | 71 |
| Ex. 4 | 0.046 | 71 |
| Ex. 5 | 0.055 | 73 |
| Ex. 6 | 0.075 | 72 |
| Comp. Ex. 1 | 0.91 | 74 |
| Comp. Ex. 2 | 0.048 | 66 |
| Comp. Ex. 3 | 0.049 | 68 |

<Filtration Test>

The filtration test was performed on the crystalline polymer microporous membranes of Examples 1 to 6, and Comparative Examples 1 to 3. An aqueous solution containing 0.01% by mass of gold colloid (average particle size of 0.1 μm) was filtered through each of the membranes with a differential pressure of 10 kPa. The results are shown in Table 3.

TABLE 3

|  | Filtration test (mL/cm$^2$) |
| --- | --- |
| Ex. 1 | 1,200 |
| Ex. 2 | 1,550 |
| Ex. 3 | 1,340 |
| Ex. 4 | 1,440 |
| Ex. 5 | 1,080 |
| Ex. 6 | 1,290 |
| Comp. Ex. 1 | 360 |
| Comp. Ex. 2 | 50 |
| Comp. Ex. 3 | 120 |

From the results shown in Table 3, it was found that the microporous membranes of Comparative Examples 1 to 3 substantially caused clogging before its filtration rate reaching 1,000 mL/cm$^2$. Compared to these, the membranes of Examples 1 to 6 could filter respectively up to 1,200 mL/cm$^2$, 1,550 mL/cm$^2$, 1,340 mL/cm$^2$, 1,440 mL/cm$^2$, 1,080 mL/cm$^2$, and 1,290 mL/cm$^2$, which showed that use of the crystalline polymer microporous membrane of the present invention significantly improves the service life of the filter.

<Flow Rate Test>

The flow rate test was performed on the crystalline polymer microporous membranes of Examples 1 to 6, and Comparative Examples 1 to 3. Specifically, IPA was passed through each membrane with a differential pressure of 100 kPa, and the permeation amount of IPA per unit area (m$^2$) per unit time (min) was determined as a flow rate (L·m$^{-2}$·min$^{-1}$). The results are shown in Table 4.

TABLE 4

|  | Flow rate test (L · m$^{-2}$ · min$^{-1}$) |
| --- | --- |
| Ex. 1 | 5.2 |
| Ex. 2 | 7.5 |
| Ex. 3 | 6.5 |
| Ex. 4 | 12.2 |
| Ex. 5 | 5.9 |
| Ex. 6 | 10.1 |
| Comp. Ex. 1 | 50.0 |
| Comp. Ex. 2 | 0.5 |
| Comp. Ex. 3 | 0.4 |

From the results shown in Table 4, the microporous membrane of Comparative Example 1 had a high flow rate because of its large pore diameters, but the microporous membranes of Comparative Examples 2 and 3 had low flow rate such as 1 L·m$^{-2}$·min$^{-1}$ or less. Compared to these, the microporous membranes of Examples 1 to 6 which had the approximately same pore diameter to those of Comparative Examples 2 and 3 had higher flow rate than those of Comparative Examples 2 and 3, by a few times or more. Accordingly, it was found that use of the crystalline polymer microporous membrane of the present invention can achieve high flow rate.

<Durability Test>

The durability test was performed on the crystalline polymer microporous membranes of Examples 1 to 6, and Comparative Examples 1 to 3. As the durability test, a pealing test using a mending tape was performed. The results were evaluated as: A, no pealing or fiber depositions was observed on the tape from the both sides of the membrane; B, pealing or fiber depositions was observed on the tape from only one side of the membrane; and C, pealing or fiber depositions was observed on the tape from the both sides of the membrane. The results are shown in Table 5.

TABLE 5

|  | Durability test |
| --- | --- |
| Ex. 1 | A |
| Ex. 2 | B |
| Ex. 3 | A |
| Ex. 4 | A |
| Ex. 5 | A |
| Ex. 6 | A |
| Comp. Ex. 1 | A |
| Comp. Ex. 2 | B |
| Comp. Ex. 3 | C |

From the results shown in Table 5, it is clear that the microporous membranes of Example 2, and Comparative Example 2, in which the low crystalline polymer layers were exposed had the fiber deposition to the tape, and the microporous membrane of Comparative Examples 3 in which the low crystalline polymer layers were provided at both surfaces gave the fiber deposition to the tape from the both sides, which had low durability. In contrast to these, the microporous membranes of Examples 1, 3 to 6, and Comparative Example 1 had no pealing or fiber deposition, and had high durability. Accordingly, it was found that the crystalline polymer microporous membrane of the present invention can attain high durability.

<Curl Test>

The curl test was performed on the crystalline polymer microporous membranes of Examples 1 to 6 and Comparative Examples 1 to 3. Each microporous membrane was placed on a flat place, and visually evaluated whether or not the microporous membrane was curled. It was evaluated as: A, no curling; B, slightly curled but curling disappeared when the membrane was placed on the flat place; and C, the membrane was curled even when it was placed on the flat place. The results are shown in Table 6.

TABLE 6

|  | Curl test |
| --- | --- |
| Ex. 1 | A |
| Ex. 2 | B |
| Ex. 3 | A |
| Ex. 4 | A |
| Ex. 5 | A |
| Ex. 6 | A |
| Comp. Ex. 1 | A |
| Comp. Ex. 2 | C |
| Comp. Ex. 3 | B |

From the results shown in Table 6, the two-layer laminate membranes had curling, but three-layer laminate membranes were not curled. Accordingly, it was found that curling can be prevented by using the crystalline polymer microporous membranes of Examples 1 and 3 to 6.

The crystalline polymer microporous membrane of the present invention and the filtration filter using such microporous membrane can efficiently capture particles for a long period of time, and are excellent in heat resistance and chemical resistance, and thus can be used in the various situations where filtration is required. The crystalline polymer microporous membrane and the filtration filter can be suitably used for precise filtration of gas, fluid, or the like. For example, the crystalline polymer microporous membrane and the filtration filter can be widely used for filtration of various gases, filtration, sterilization, and high temperature filtration of washing water for electronic industry, medical water, water used in pharmaceutical production processes, water for use in the food industry, and filtration of reactive chemicals. Furthermore, the crystalline polymer microporous membrane and the filtration filter can also used as a wire coating material.

What is claimed is:

1. A crystalline polymer microporous membrane, comprising:
   a laminate of two or more layers including a layer containing a first crystalline polymer and a layer containing a second crystalline polymer, the laminate having a plurality of pores each piercing through the laminate in a thickness direction thereof,
   wherein the first crystalline polymer has higher crystallinity than crystallinity of the second crystalline polymer, and the layer containing the first crystalline polymer has the maximum thickness that is 1.5 times or more thicker than the maximum thickness of the layer containing the second crystalline polymer, and
   wherein at least one layer in the laminate has a plurality of pores whose average diameter continuously or discontinuously changes along with a thickness direction of the laminate at least at part thereof.

2. The crystalline polymer microporous membrane according to claim 1, wherein the laminate contains two or more layers of the layer containing the first crystalline polymer, and one layer of the layer containing the second crystalline polymer.

3. The crystalline polymer microporous membrane according to claim 2, wherein the laminate contains two layers of the layer containing the first crystalline polymer, and one layer of the layer containing the second crystalline polymer provided between the two layers of the layer containing the first crystalline polymer.

4. The crystalline polymer microporous membrane according to claim 3, wherein the two layers of the layer containing the first crystalline polymer each has a thickness larger than that of the layer containing the second crystalline polymer.

5. The crystalline polymer microporous membrane according to claim 1, wherein the crystalline polymer microporous membrane has a thickness of 1 μm to 300 μm.

6. The crystalline polymer microporous membrane according to claim 1, wherein the crystallinity of the first crystalline polymer is 1.02 or more times the crystallinity of the second crystalline polymer.

7. The crystalline polymer microporous membrane according to claim 1, wherein the first crystalline polymer is polytetrafluoroethylene.

8. The crystalline polymer microporous membrane according to claim 1, wherein the second crystalline polymer is polytetrafluoroethylene, or a polytetrafluoroethylene copolymer.

9. The crystalline polymer microporous membrane according to claim 8, wherein the polytetrafluoroethylene copolymer is a copolymer containing at least two polymer components selected from the group consisting of tetrafluoroethylene, perfluoroalkylvinyl ether, hexafluoropropylene, and chlorotrifluoroethylene.

10. The crystalline polymer microporous membrane according to claim 1, wherein the pores on one surface of the crystalline polymer microporous membrane have an average pore diameter of 0.05 μm to 1.0 μm, and the pores on the other surface of the crystalline polymer microporous membrane have an average pore diameter of 0.5 μm to 100 μm.

11. A filtration filter, comprising:
   a crystalline polymer microporous membrane,
   wherein the crystalline polymer microporous membrane contains:
   a laminate of two or more layers including a layer containing a first crystalline polymer and a layer containing a second crystalline polymer, the laminate having a plurality of pores each piercing through the laminate in a thickness direction thereof,
   wherein the first crystalline polymer has higher crystallinity than crystallinity of the second crystalline polymer, and the layer containing the first crystalline polymer has the maximum thickness that is 1.5 times or more thicker than the maximum thickness of the layer containing the second crystalline polymer, and
   wherein at least one layer in the laminate has a plurality of pores whose average diameter continuously or discontinuously changes along with a thickness direction of the laminate at least at part thereof.

12. The filtration filter according to claim 11, wherein a surface of the crystalline polymer microporous membrane having an average pore diameter larger than the other surface thereof is arranged as a filtering surface of the filtration filter.

* * * * *